United States Patent
Yoo et al.

(10) Patent No.: US 10,713,095 B2
(45) Date of Patent: Jul. 14, 2020

(54) MULTI-CORE PROCESSOR AND METHOD OF CONTROLLING THE SAME USING REVISABLE TRANSLATION TABLES

(71) Applicant: Samsung Electronics Co., Ltd., Suwon-si, Gyeonggi-do (KR)

(72) Inventors: Donghoon Yoo, Suwon-si (KR); Bernhard Egger, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 187 days.

(21) Appl. No.: 15/469,828

(22) Filed: Mar. 27, 2017

(65) Prior Publication Data

US 2017/0277571 A1 Sep. 28, 2017

(30) Foreign Application Priority Data

Mar. 28, 2016 (KR) .................. 10-2016-0036967

(51) Int. Cl.
*G06F 9/50* (2006.01)

(52) U.S. Cl.
CPC ........... *G06F 9/5044* (2013.01); *G06F 9/505* (2013.01); *G06F 9/5022* (2013.01); *G06F 9/5027* (2013.01); *G06F 9/50* (2013.01); *Y02D 10/22* (2018.01)

(58) Field of Classification Search
CPC .... G06F 9/5044; G06F 9/5027; G06F 9/5022; G06F 9/505; G06F 9/50
See application file for complete search history.

(56) References Cited

U.S. PATENT DOCUMENTS

| | | | |
|---|---|---|---|
| 5,572,680 A | | 11/1996 | Ikeda et al. |
| 5,835,963 A | * | 11/1998 | Yoshioka ............ G06F 12/1054 |
| | | | 711/207 |
| 6,732,251 B2 | | 5/2004 | Harris et al. |
| 7,000,051 B2 | | 2/2006 | Armstrong et al. |
| 7,669,203 B2 | * | 2/2010 | Samra ................... G06F 9/3851 |
| | | | 712/233 |
| 7,769,938 B2 | | 8/2010 | Kaushik et al. |
| 8,286,162 B2 | | 10/2012 | Neiger et al. |
| 8,489,789 B2 | | 7/2013 | Serebrin et al. |
| 8,954,658 B1 | * | 2/2015 | Asnaashari ........... G06F 3/0604 |
| | | | 711/103 |
| 9,116,869 B2 | | 8/2015 | Madukkarumukumana et al. |
| 2004/0148603 A1 | * | 7/2004 | Baylis ................. G06F 9/45504 |
| | | | 718/100 |

(Continued)

FOREIGN PATENT DOCUMENTS

| | | |
|---|---|---|
| JP | 2977688 B2 | 11/1999 |
| JP | 2002-149403 A | 5/2002 |

(Continued)

*Primary Examiner* — Meng Ai T An
*Assistant Examiner* — Michael W Ayers
(74) *Attorney, Agent, or Firm* — Harness, Dickey and Pierce, P.L.C.

(57) ABSTRACT

A method of controlling a multi-core processor includes allocating at least one core of the multi-core processor to at least one process for execution; generating a translation table with respect to the at least one process to translate a logical ID of the at least one core allocated to the at least one process to a physical ID; and controlling the at least one process based on the translation table generated with respect to the at least one process.

17 Claims, 8 Drawing Sheets

(56) References Cited

U.S. PATENT DOCUMENTS

| | | | |
|---|---|---|---|
| 2011/0088038 A1* | 4/2011 | Kruglick | G06F 9/54 |
| | | | 718/104 |
| 2011/0197003 A1* | 8/2011 | Serebrin | G06F 9/45558 |
| | | | 710/267 |
| 2011/0197004 A1 | 8/2011 | Serebrin et al. | |
| 2012/0266179 A1* | 10/2012 | Osborn | G06F 9/5077 |
| | | | 718/105 |
| 2013/0080732 A1 | 3/2013 | Nellans et al. | |
| 2014/0101670 A1 | 4/2014 | Bae | |
| 2014/0344550 A1 | 11/2014 | Kruglick | |
| 2016/0080732 A1 | 3/2016 | Pedley et al. | |
| 2016/0252943 A1* | 9/2016 | Varma | G06F 15/00 |
| | | | 713/310 |

FOREIGN PATENT DOCUMENTS

| | | |
|---|---|---|
| KR | 10-1004240 B1 | 12/2010 |
| KR | 10-2012-0131175 A | 12/2012 |
| KR | 10-201400445 A | 4/2014 |

\* cited by examiner

| LOGICAL ID (410) | PHYSICAL ID (420) |
|---|---|
| 0 | 3 |
| 1 | 1 |
| 2 | 0 |
| 3 | 7 |
| 4 | 5 |
| 5 | 6 |
| 6 | 2 |
| 7 | 4 | ion No. 10-2016-0036967, filed
MULTI-CORE PROCESSOR AND METHOD OF CONTROLLING THE SAME USING REVISABLE TRANSLATION TABLES

CROSS-REFERENCE TO RELATED APPLICATION

This application claims the benefit under 35 USC 119(a) of Korean Patent Application No. 10-2016-0036967, filed on Mar. 28, 2016, in the Korean Intellectual Property Office, the entire disclosure of which is incorporated herein by reference for all purposes.

BACKGROUND

1. Field

The following description relates to multi-core processors and methods of controlling the same.

2. Description of Related Art

A multi-core is a package including two or more independent cores combined into a single integrated circuit. A core in a multi-core processor is a semiconductor circuit part which, generally, does not include a shared cache memory in the core part of a circuit of a processor. However, a cache memory for exclusive use of the core (and not for sharing with other elements) is commonly included in the core. Simultaneous Multi-Threading (SMT) is a technique which is similar to that used by the multi-core for process management. However, SMT differs in a number of way from the multi-core's technique. For example, SMT practically has heretofore only ever been used internally, within a single core, as it not adapted to synergistic orchestration of processing amongst a series of interconnected cores. To reduce power consumption and heat generation, an operation voltage or a clock speed of each core of the multi-core processor is independently controlled and an operation state including an idle state is controlled in some multi-core products. Therefore, various attempts have been conducted to obtain a method of allocating and re-allocating cores of a multi-core for optimizing process performance.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to a general aspect, a method of controlling a multi-core processor, the method includes allocating at least one core of the multi-core processor to at least one process for execution; generating a translation table with respect to the at least one process to translate a logical ID of the at least one core allocated to the at least one process to a physical ID; and controlling the at least one process based on the translation table generated with respect to the at least one process.

At least one process may include a first process, and the controlling of the at least one process may include changing the at least one core allocated to the first process with another core; and revising the translation table with respect to the first process in response to the at least one core allocated to the first process being changed with the other core.

The at least one core allocated to the first process may include a first core, and the changing of the at least one core with the other core may include: copying information from the first core to a second core, wherein the second core may be a core that is not allocated to the first process; releasing the allocation of the first core with respect to the first process; and allocating the second core to the first process.

The revising of the translation table may include revising a physical ID of the core in the translation table with respect to the first process to a physical ID of the second core.

The at least one process may further includes a second process, and the second core may be one of at least one core allocated to the second process, wherein the changing of the core with the other core may further include copying information from the second core to the first core; releasing the allocation of the second core with respect to the second process; and allocating the first core to the second process.

The revising of the translation table may include revising a physical ID of the first core in the translation table, with respect to the first process, to a physical ID of the second core; and revising a physical ID of the second core in the translation table, with respect to the second process, to a physical ID of the first core.

The generating of the translation table may include generating a first translation table with respect to the first process; storing the first translation table in a memory; and storing an address of the memory where the first translation table is stored in a register of the at least one core allocated to the first process.

The at least one process may include a first process, and the controlling of the first process may include communicating with the at least one core allocated to the first process via the translation table.

According to another general aspect, a multi-core processor includes a plurality of cores, the multi-core processor including a core manager configured to allocate at least one core from among the plurality of cores to at least one process and generate a translation table with respect to the process to translate a logical ID of the at least one core allocated to the at least one process to a physical ID; and a controller configured to control the at least one process by using the translation table generated with respect to the at least one of the processes.

The at least one process may include a first process, and the core manager may be further configured to change the at least one core allocated to the first process with another core and revise the translation table with respect to the first process when the at least one core allocated to the first process is changed with the other core.

The at least one core allocated to the first process may include a first core, and the core manager may be further configured to copy information from the first core to a second core, wherein the second core may be a core that was not allocated to the first process, release the allocation of the first core with respect to the first process, and allocate the second core to the first process.

The core manager may be further configured to revise a physical ID of the first core in the translation table, with respect to the first process, to a physical ID of the second core.

The at least one process may include a second process, the second core may be one of the at least one core allocated to the second process, and the core manager may be further configured to copy information from the second core to the first core, release the allocation of the second core with respect to the second process, and allocate the first core to the second process.

The core manager may be further configured to revise a physical ID of the first core in the translation table, with respect to the first process, to a physical ID of the second core and revise a physical ID of the second core in the translation table, with respect to the second process, to a physical ID of the first core.

Each of the cores may include a register configured to store an address of the translation table, the core manager may be further configured to generate a first translation table with respect to the first process in the at least one of the processes, control the first translation table to be stored in a memory, and store an address of the memory where the first translation table is stored in the register of the at least one core allocated to the first process.

The at least one process may include a first process and the controller may be further configured to communicate with the at least one core allocated to the first process.

A non-transitory computer-readable storage medium may store instructions that, when executed by a processor, cause the processor to perform the method.

According to another general aspect, a method of controlling a multi-core processor includes allocating a core of the multi-core processor to a computer process for execution of the computer process thereon; generating a core translation table for the computer process in a memory, the core translation table registering a physical core identifier of the allocated core of the multi-core processor to correspond with a logical core identifier therefor; and, executing the computer process on the allocated core of the multi-core processor based on the logical core identifier of the generated core translation table.

The method may further include stopping execution of the allocated core having a physical core identifier corresponding with the logical core identifier; and, reallocating another core of the multi-core processor to the computer process by modifying the logical core identifier in the generated core translation table to indicate a physical core identifier of the reallocated other core of the multi-core processor; and, executing the computer process on the reallocated other core based on the same logical core identifier, wherein the logical core identifier indicates the physical core identifier of the reallocated other core.

Either one or both of the computer process and a task scheduler may be actuated to execute the computer process on the logical core identifier via transmission of a control order, and a resource manager may intercept the control order for the logical core identifier and transforms the logical core identifier to a physical core identifier for the allocated core, based on the core translation table, for execution of the computer process thereon.

Neither the computer process, nor the task scheduler, may be provided with a physical core identifier or an address to the core translation table.

Either one or both of the computer process and a task scheduler may generate a control order directed at the allocated core by reference to the logical core identifier, and after reallocation to the other core, either one or both of the computer process and the task scheduler employ the same, substantially unchanged, control order.

According to another general aspect, a management apparatus of a multi-core processor having a plurality of cores, the management apparatus includes a first core configured to: allocate a second core from among the plurality of cores to a process and generate a translation table with respect to the process to translate a logical ID of the allocated second core to a physical ID; and control the process via the generated translation table.

The management apparatus may further include a memory configured to store instructions, wherein the first core is further configured to execute the instructions to configure the first core of the multi-core processor to allocate the second core from among the plurality of cores to at least one process and generate the translation table with respect to the process to translate the logical ID of the second core allocated to the process to the physical ID, and control the process by using the translation table generated with respect to the process.

The first core may include a core manager configured to allocate the second core from among the plurality of cores to at least one process and generate the translation table with respect to the process to translate the logical ID of the second core allocated to the process to the physical ID; and a controller configured to control the process by using the translation table generated with respect to the process.

The first core may be different from the second core.

Other features and aspects will be apparent from the following detailed description, the drawings, and the claims.

BRIEF DESCRIPTION OF THE DRAWINGS

FIG. 4 shows a translation table, according to an embodiment.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
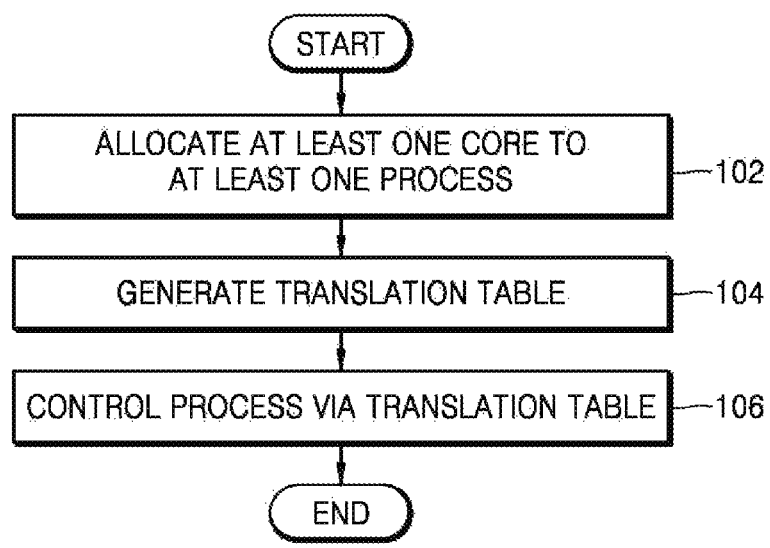
FIG. 1 is a flowchart of a method of controlling a multi-core processor, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terminologies used herein are selected as commonly used by those of ordinary skill in the art in consideration of functions of the current embodiment, but may vary according to the technical intention, precedents, or a disclosure of a new technology. Also, in particular cases, some terms are selected by the applicant, and in this case, the meanings of the terms will be described in detail at corresponding parts of the specification. Accordingly, the terms used in the specification should be defined not by simply the names of the terms but based on the meaning and contents of the whole specification.

It will be understood that when a part is referred to as being "connected" to another element, it includes when the part is directly connected to the other element and is electrically connected to another element by intervening another constituent element therebetween. It should be understood that, when a part "comprises" or "includes" a constituent element in the specification, unless otherwise defined, it is not excluding other elements but may further include other constituent elements. Also, in the specification, the term "unit" or "module" denotes a unit that processes at least a function or an operation, and the function and operation, according to an embodiment, is realized by hardware.

The terms "comprise" or "comprising" used in the embodiments should not be interpreted that various constituent elements or various operations described in the specification are necessarily included. Also, it should be interpreted that some of the constituent elements and some operations may not be included, and additional constituent elements or operations may further be included as will be understood by one of skill in the art after gaining a thorough understanding of the disclosure.

The descriptions of the embodiments should not be interpreted as being restricted to that which is explicitly disclosed. Rather, embodiments that are readily inferred from a thorough understanding of the totality of the detailed descriptions, figures, and claims, and embodiments apparent to those of ordinary skill in the art will be understood to be included. Reference will now be made in detail to embodiments, examples of which are illustrated in the accompanying drawings.

FIG. 1 is a flowchart of a method of controlling a multi-core processor, according to an embodiment.

In an operation 102, the multi-core processor allocates at least one core to at least one process. The process denotes a program executed in the multi-core processor by at least one core. The process is a task or an object scheduled for execution.

The process denotes a computer program executed in a computer. The program denotes an executing code generally stored in a hard disc, etc., and the process may be referred to as a task unit executing a program and a program state by driving a program in a memory. For example, the process is an application or a virtual machine, but is not limited thereto.

In an operation 104, the multi-core processor generates a translation table with respect to each process. The translation table is used for translating a logic ID with respect to at least one core allocated to each process to a physical ID.

The translation table includes a logical ID field and a physical ID field. Alternatively, the translation table may include only the physical ID field, according to one or more embodiments. In this case, an index that indicates the physical ID field is used as a logical ID.

In an operation 106, the multi-core processor controls each of the processes via each of the generated translation tables. The multi-core processor communicates with the at least one core allocated in a first process via a translation table generated with respect to the first process. For example, the at least one core allocated to the first process includes a first core and a second core. At this point, the first core transmits a message to the second core based on a logical ID of the second core. For example, the first core transmits an inter-core interrupt (ICI) with respect to the second core based on the logical ID of the second core. The multi-core processor translates a logical ID of the second core to a physical ID of the second core via the generated translation table with respect to the first process. The multi-core processor transmits an ICI to the second core based on the physical ID of the second core.

Figure 2:
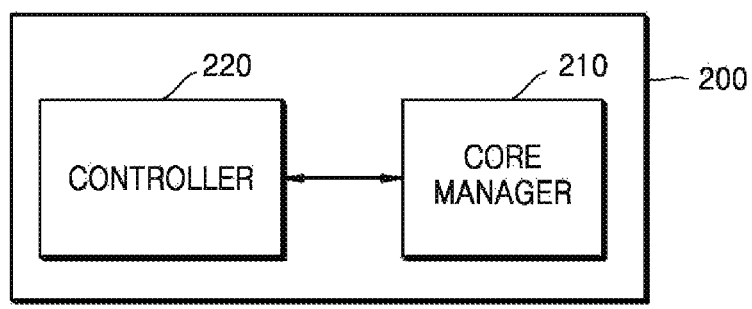
FIG. 2 is a block diagram of a multi-core processor, according to an embodiment.

FIG. 2 is a block diagram of a multi-core processor 200 according to an embodiment. The method of controlling the multi-core processor described with reference to FIG. 1, or other such method, may be used to control the multi-core processor 200 depicted in FIG. 2, or other such multi-core processor, and the multi-core processor 200 depicted in FIG. 2 may perform the operations described with respect to FIG. 1.

Referring to FIG. 2, the multi-core processor 200 includes a core manager 210 and a controller 220. The multi-core processor 200 depicted in FIG. 2 may include other elements, but is shown in simplified form for clarity and conciseness. Accordingly, it should be understood by those of ordinary skill in the art, after gaining a thorough understanding of the detailed description, that common constituent elements may further be included in the multi-core processor 200 besides the elements depicted in FIG. 2.

The multi-core processor 200 includes a plurality of cores. An operation performed by the core manager 210 and the controller 220, according to one or more embodiments, may be performed by at least one core included in the multi-core processor 200. Also, the operation performed by the core manager 210 and the controller 220 may be performed by an additional hardware included in the multi-core processor 200.

The core manager 210 allocates at least one core to at least one process. Also, the core manager 210 generates a translation table with respect to each process to translate a logical ID of the at least one core allocated to each process to a physical ID.

The core manager 210 may, in response to changing operational conditions, change at least one core which is allocated to a process to another core. For example, the core manager 210 changes a core allocated to a first process to another core. Also, the core manager 210 may additionally allocate additional core/(s) to the first process.

When the core allocated to the first process is reallocated to another core, the core manager 210 revises a translation table with respect to the first process. The practical description for changing a core allocated to a process to another core and the practical description of revising a translation table are described further below with reference to FIGS. 6 through 9.

The core manager 210 controls the generated translation table to be stored in a memory. The core manager 210 stores a table (such as an array, string, struct, object, or other suitable data storage structure) or a pointer to the table, such as a memory address where the translation table is stored in a register in a core, cache, or other suitable memory location.

The memory may be included in the multi-core processor 200 or may be located outside of the multi-core processor 200.

The controller 220 controls each process based on each of the translation tables generated with respect to each process. For example, the controller 220 controls communication between cores via a translation table. The controller 220 control cores to transmit a message or ICI via a translation table.

Figure 3:
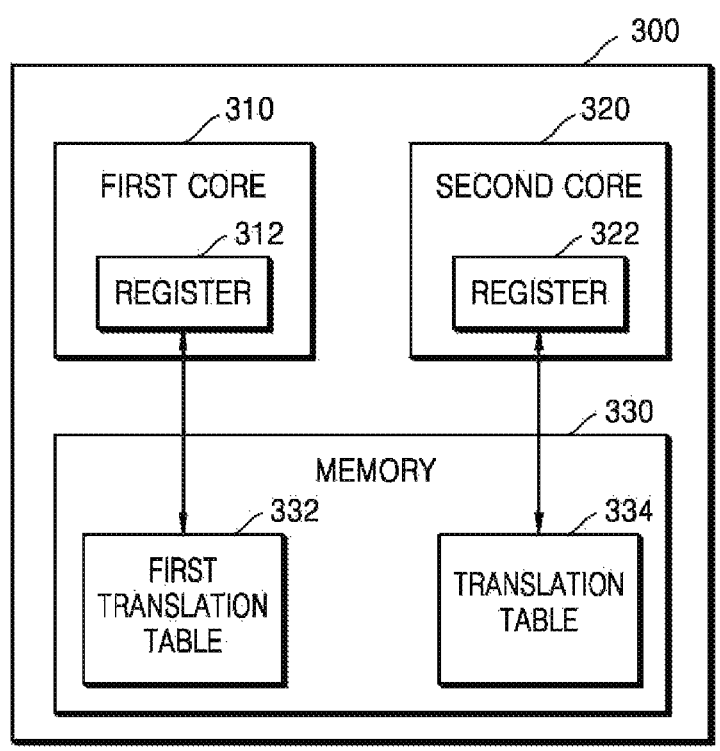
FIG. 3 is a block diagram of a computing device, according to an embodiment.

FIG. 3 is a block diagram of a computing device 300 according to an embodiment.

The computing device 300 includes a first core 310, a second core 320, and a memory 330. For example, the memory 330 includes a random access memory (RAM), such as dynamic random access memory (DRAM) or a static random access memory (SRAM), or a a read-only memory (ROM) or electrically erasable programmable read-only memory (EEPROM), but the kind of the memory 330 is not limited thereto.

The computing device 300 includes a first core 310 and a second core 320. The computing device 300 allocates at least one core that includes the first core 310 in the first process.

The computing device 300 generates a first translation table 332 that translates a logical ID with respect to the at least one core allocated to the first process to a physical ID (which is a fixed and permanent identification of the core). The computing device 300 controls the first translation table 332 to be stored in the memory 330.

According to one or more embodiments, the computing device 300 stores an address of a memory in which the first translation table 332 is stored in a register in the at least one core allocated to the first process. For example, the computing device 300 stores an address of a memory in which the first translation table 332 is stored in a register 312 in the first core 310.

The computing device 300 allocates at least one core that includes the second core 320 to a second process. The computing device 300 generates a second translation table 334 that translates a logical ID with respect to the at least one core allocated to the second process to a physical ID. The computing device 300 controls the second translation table 334 to be stored in the memory 330.

The computing device 300 stores an address of a memory in which the second translation table 334 is stored in a register in the at least one core allocated to the second process. For example, the computing device 300 stores an address of a memory in which the first translation table 334 is stored in a register 322 in the second core 320.

FIG. 4 is a drawing of a translation table 400 according to an embodiment.

Referring to FIG. 4, the translation table 400 includes a logical ID field 410 and a physical ID field 420. The translation table 400, according to one or more embodiments, does not include an additional memory space for the logical ID field 410. For example, the translation table 400 includes only a memory space to contain a value representing the physical ID field 420, the values are indexed for indicating the physical ID field 420 with the logical ID. For example, a one dimensional array, having a size corresponding to the number of physical cores, is employed to register core allocations based on array position within the array. In such manner, as would be known to one of skill in the art after gaining a thorough understanding of the detailed description, values in the array indicating physical core ID allocation are retrieved by invoking the array and a position therewithin e.g. translationTable(0) would return physical core ID "3" in the example of FIG. 4. Similarly, invocation of translationTable(7) would return physical core ID "4". One may employ such array, for example, in the sending of ICI interrupts e.g. ICI(translationTable(3)) to communicate with physical core ID 7—according to the translation table for the specific process corresponding with FIG. 4.

Unlike the above, the translation table 400, according to one or more embodiments, may include an additional memory space for the logical ID field 410. The translation table 400 depicted in FIG. 4 is a non-limiting example, and thus, the type of the translation table 400 is not limited thereto and any suitable memory structure for registering correspondence between physical core ID and logical core ID may be employed Referring to FIG. 4, the multi-core processor 200, depending upon a process's computational requirements, may allocate eight cores to a single process. For example, the multi-core processor 200 may allocate eight cores, that is, physical ID 0 through 7 to a single process. Indices that indicate the physical ID field 420 are 0 through 7, the multi-core processor 200 may use 0 through 7 as logical IDs. However, the number of cores included in the multi-core processor 200 and the number of cores allocated to each process are not limited.

In the example translation table 400, the logical ID 0 corresponds to the physical ID 3, and the logical ID 1 corresponds to the physical ID 1. The method of matching the logical ID to the physical ID is not limited, and, in some cases, the logical ID may be the same as the physical ID (that is not to say that the logical IDs are the same as the physical IDs, but where, for example, the logical IDs and Physical IDs enumerate the cores with integers or other repeating identifier values, there may be an overlap or identity of those values at some point in time during dynamic allocation and reallocation of one or more cores (e.g. a core having physical ID 1 may, at some point, for some process, also be allocated logical ID 1)—however, amongst the logical IDs, each ID for each core is unique and, amongst the physical IDs, each core ID is unique). In one or more other embodiments, the logical ID and physical IDs may be provided a globally unique string identifier or other such suitably orthogonal values to identify each core uniquely. The sequence of storing the physical IDs in the physical ID field 420 is not limited, that is, the physical IDs, according to one or more embodiments, may be stored according to load balancing algorithms in response to changing operational or computational requirements of a particular process, based on a survey of all (or a plurality of) processes, randomly, or sequentially stored in the physical ID field 420. Additionally, or in the alternative, weighting or spreading algorithms may be employed to either cluster or de-cluster processes on particular cores, or blocks containing cores in the sequence of storing the physical IDs.

The multi-core processor 200 provides information of a logical ID of each core. However, the multi-core processor 200 may not provide the information of a physical ID to the process. The multi-core processor 200 may not allow the process to have an access right with respect to the translation table 400 or the physical core IDs, and, in this sense, provides a measure of abstraction isolating the processes from direct access to the physical core IDs.

For example, the multi-core processor 200 selectively establishes security access rights and prohibits the processes from having an access right, such as a writing and/or reading right with respect to a register in which an address of a memory where the translation table 400 is stored. Rather, the processes are only allowed limited access, such as by, for example, actuating a resource manager to intercept the process, scheduler, or core interrupt or control orders directed to a logical ID and seamlessly re-routing the control order or interrupt to the actual physical ID such as by, e.g. a getPhysicalId( ) function in the resource manager, or other such suitable function which supplies the physical core ID according to the parameter input within the parentheses, e.g. logical core ID "2" based on the values stored in the corresponding process core translation table. This is because, if each process is allowed to have a right to obtain information with respect to the physical ID field 420 of a core and a right to revise the translation table 400, it may be difficult for the multi-core processor 200 to manage all of the cores.

Accordingly, the multi-core processor 200 does not allow each process to have an access and/or modify right with respect to the translation table 400. That is, the process controls cores based on the logical IDs and not the physical IDs. The multi-core processor 200 allows the cores to perform a control order by changing a logical ID included in a control order of a process to a physical ID.

For example, the process allows a core having a logical ID 0 to send a message to a core having a logical ID 6. The multi-core processor 200 changes the logical ID 0 to the physical ID 3 based on the translation table 400, and a logical ID 6 is changed to physical ID 2. Accordingly, the multi-core processor 200 enables the physical ID 3 to send a message with respect to the physical ID 2.

Meanwhile, the multi-core processor 200 changes the at least one core allocated to the process and revises the translation table 400. In other words, the multi-core processor 200 remaps the at least one core. The multi-core processor 200 reallocates a core having physical ID 9 instead of the core having physical ID 7 to the process. At this point, the multi-core processor 200 releases the allocation of the core having a physical ID 7 and allocates the core having a physical ID 9 to the process. That is, the multi-core processor 200 revises the physical ID 7 included in the physical ID field 420 of the translation table 400 to the physical ID 9. Afterwards, when the process is going to control the core having a logical ID 3, the core having the physical ID 9 performs the control order.

Figure 5:
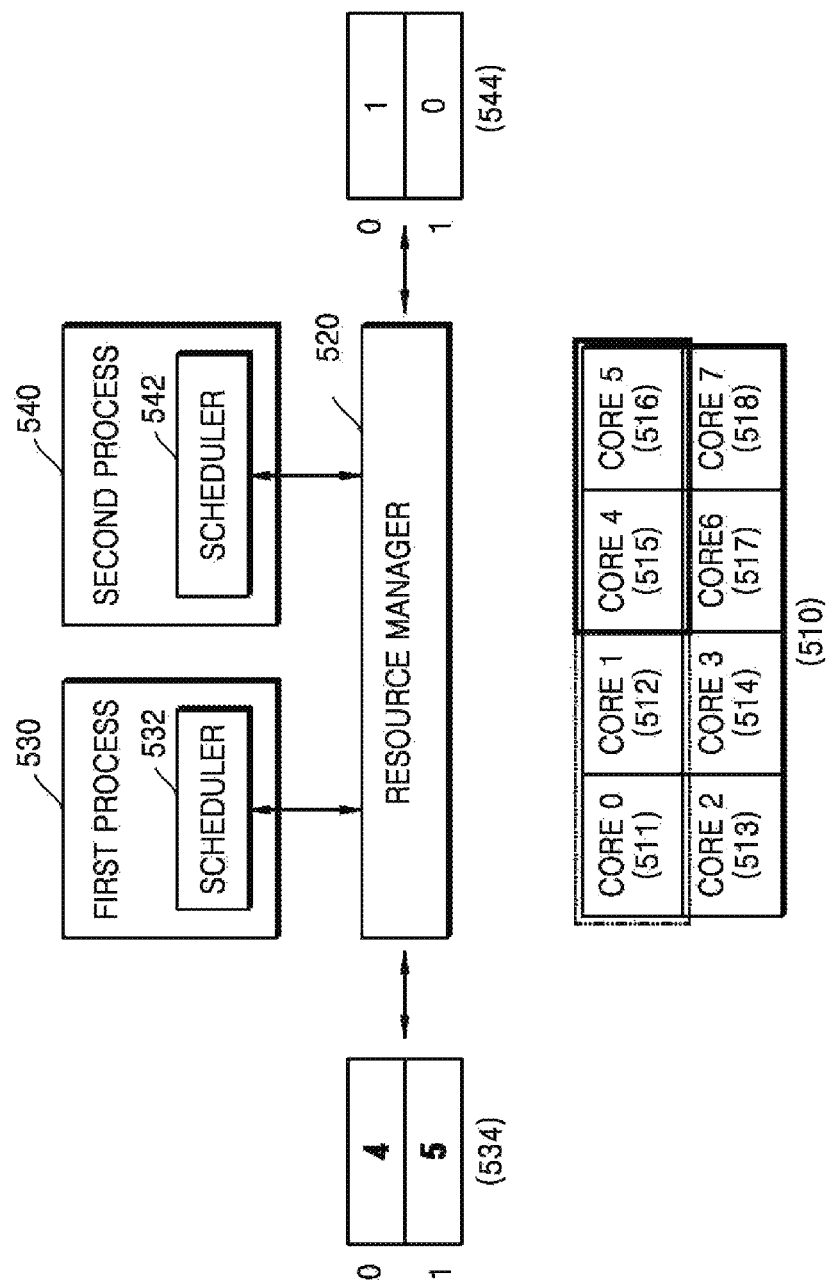
FIG. 5 shows a drawing explaining a method of controlling a multi-core processor, according to an embodiment.

FIG. 5 is a drawing explaining a method of controlling the multi-core processor 200, according to an embodiment.

Referring to FIG. 5, the multi-core processor 200 includes cores having physical IDs 0 through 7 (hereinafter, a core having a physical ID n is referred to as a core n). A resource manager 520 corresponds to the core manager 210 and the controller 220 of FIG. 2.

The resource manager 520, according to one or more embodiments, runs under a low-level runtime environment. Also, a first process 530 and a second process 540 run under a high-level runtime environment.

The resource manager 520 runs at least one of 0 through 7 cores. Also, the resource manager 520 may run in connection with additional hardware. The resource manager 520 is a relatively coarse-grained resource manager, according to one or more embodiments.

The first process 530 and the second process 540 respectively, according to an embodiment, include schedulers 532 and 542. The schedulers 532 and 542 set-up a schedule of the first and second processes 530 and 540. The schedulers 532 and 542, unlike the resource manager 520, run at a high-level runtime environment, and thus, are enabled to have an access right (or a set of access rights) different from that of the resource manager 520. For example, the resource manager 520, according to an embodiment, is provided with appropriate access permissions (or an address to the translation table) for first and second translation tables 534 and 544, but the schedulers 532 and 542 may not access the first and second translation tables 534 and 544.

The resource manager 520 allocates a physical core 4 515 and a physical core 5 516 to the first process 530. The resource manager 520 generates the first translation table 534 and stores the first translation table 534 in a memory. The resource manager 520 stores an address of a memory of the first translation table 534 in a register included in the core 4 515 and/or the core 5 516.

The resource manager 520 controls the first process 530 based on the first translation table 534. Meanwhile, the resource manager 520 does not allow the first process 530 and the scheduler 532 of the first process 530 to have an access right with respect to the register where the address of the memory of the first translation table 534 included in the core 4 515 and the core 5 516. Accordingly, the first process 530 and the scheduler 532 of the first process 530 may not know a physical ID of a core allocated to the first process 530. The first process 530 and the scheduler 532 of the first process 530 transmits a control order with respect to the core 0 and the core 1 based on a logical ID, and not the physical ID. The resource manager 520, according to an embodiment, intercepts the control order bearing the logical ID, transforms the logical ID into a corresponding physical ID, based on the translation table, and transmits a control order with respect to the core 4 515 and the core 5 516 based on the first translation table 534.

The resource manager 520 allocates a core 0 511 and a core 1 512 to the second process 540. The resource manager 520 generates the second translation table 544, and stores the second translation table 544 in a memory. The resource manager 520 stores an address of a memory of the second translation table 544 in a register included in the core 0 511 and the core 1 512.

The resource manager 520 controls the second process 540 based on the second translation table 544. Meanwhile, the resource manager 520 does not allow the second process 540 and the scheduler 542 of the second process 540 to have an access right with respect to the register where the address of the memory of the second translation table 544 included in the core 0 511 and the core 1 512 is stored. Accordingly, the second process 540 and the scheduler 542 of the second process 540 are prevented from determining a physical ID of a core allocated to the second process 540. The second process 540 and the scheduler 542 of the second process 540 transmit a control order with respect to the core 0 511 and the core 1 512 based on a logical ID only. The resource manager 520 transmits a control order with respect to the core 0 511 and the core 1 512 based on the second translation table 544.

Figure 6:
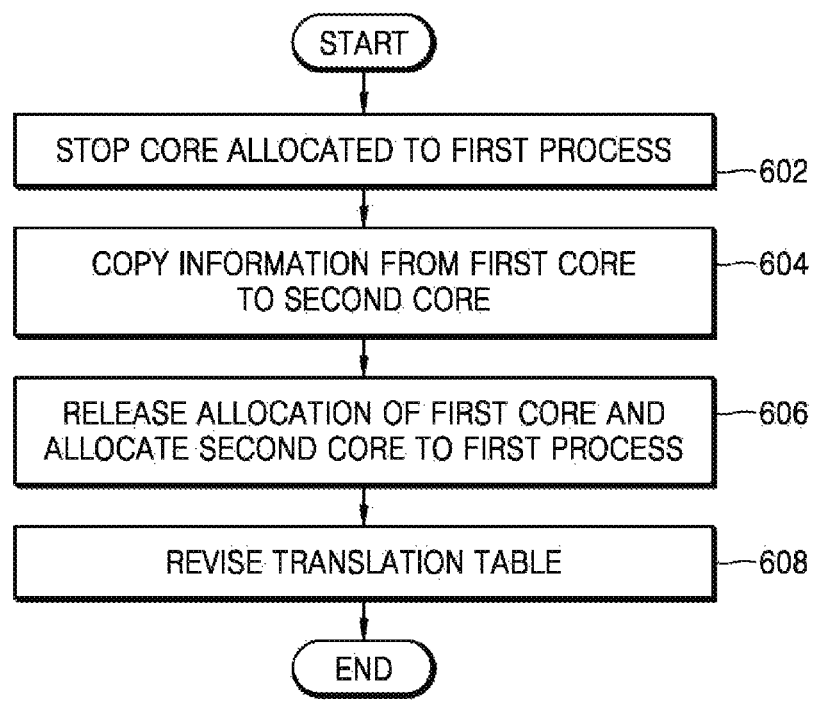
FIG. 6 is a flowchart of a method of changing an allocated core with another core in a process, according to an embodiment.

FIG. 6 is a flowchart of a method of changing an allocated core to another core in a process according to an embodiment. For example, the multi-core processor 200 changes a first core allocated in a first process to a second core which is a core that is not allocated to the first process.

In an operation 602, the multi-core processor 200 stops at least one core allocated to a first process. At this point, according to an embodiment, the multi-core processor 200 stops all clocks of cores allocated to the first process.

In an operation 604, the multi-core processor 200 copies information included in the first core (which was allocated to the first process) to the second core (which is to become allocated to the first process in lieu of the first core). At this point, the multi-core processor 200 copies volatile information (or address pointers to the volatile information)

included in the first core to the second core. For example, the multi-core processor 200 copies information (or address pointers to information stored, for example, on a cache memory such as SRAM) stored in registers in the first core to registers in the second core. Also, the multi-core processor 200, according to one or more embodiments, copies cache information included in the first core to a cache in the second core. In these cases, the multi-core processor 200 flushes cache information of the first core and performs a write-back operation to refresh the cache.

In an operation 606, the multi-core processor 200 releases the allocation of the first core with respect to the first process. Also, the multi-core processor 200 allocates the second core to the first process.

In an operation 608, the multi-core processor 200, or resource manager, revises a translation table with respect to the first process. At this point, the multi-core processor 200 revises a physical ID of the first core included in the translation table with respect to the first process to a physical ID of the second core.

Figure 7:
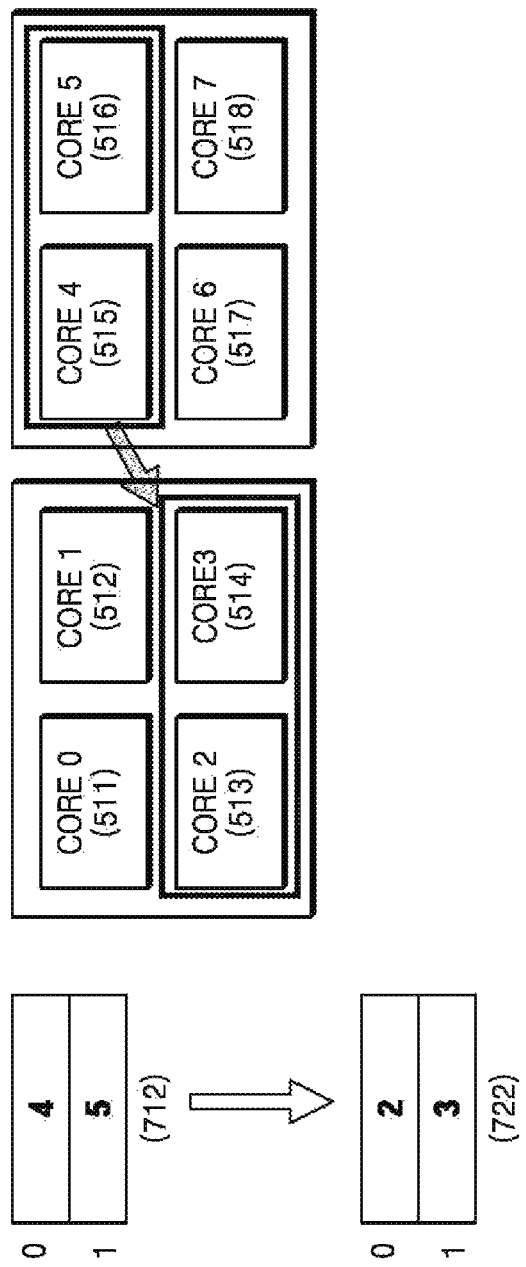
FIG. 7 shows a drawing explaining a method of translating an allocated core to another core in a process, according to an embodiment.

FIG. 7 is a drawing explaining a method of changing an allocated core to another core in a process according to an embodiment.

Referring to FIG. 7, the multi-core processor 200 includes core 0 511 through core 7 518. The eight cores included in the multi-core processor 200, according to an embodiment, are divided into two blocks, however, the number of cores and the number of blocks are merely a non-limiting, illustrative example. The multi-core processor 200 may have any suitable number of cores and these cores may be divided into any suitable number of blocks or other divisions. For example, the core 0 511 through core 3 514 are included in one block, and the core 4 515 through the core 7 518 may be included in another block.

For example, the multi-core processor 200 allocates the core 4 515 and the core 5 516 to the first process, and generates a translation table 712 with respect to the first process. In the translation table 712, a logical ID 0 corresponds to the core 4 515, and the logical ID 1 corresponds to the core 5 516.

The multi-core processor 200 changes at least one core allocated to the first process to another core. That is, the multi-core processor 200 reallocates the core 2 513 and the core 3 514 to the first process. As depicted in FIG. 5, the second process uses the core 0 511 and the core 1 512. In this example, the multi-core processor 200 changes the block that includes the core 4 515 through the core 7 518 to an idle state (or a power saving state) by allocating the core 2 513 and the core 3 514 to the first process and by effecting the allocation with respect to the core 4 515 and the core 5 516. The multi-core processor 200 reduces power consumption thereof by activating the core 0 through the core 3 514 and by changing the core 4 515 through core 7 518 to an idle state.

Due to each process using only the logical ID, the multi-core processor 200 does not provide information related to a core change to each process, but instead selectively and intelligently revises a translation table for the specific process to thereby improve the functioning of the multi-core processor itself by reducing unnecessary ICI interrupts, process coordination, and system resource usage in the dynamic allocation of cores amongst the processes. Accordingly, each process controls cores based on the same control order before and after changing the cores. The multi-core processor 200 controls cores to perform each process by changing a logical ID included in the control order of each process to a physical ID of the changed core based on the changed translation table.

A practical method, according to one or more embodiments, of reallocating a core is as follows. The multi-core processor 200 stops the core 4 515 and the core 5 516 that are allocated to the first process. For example, the multi-core processor 200 stops clocks of the core 4 515 and the core 5 516.

The multi-core processor 200 copies information included in the core 4 515 to the core 2 513. The multi-core processor 200 copies volatile information included in the core 4 515 to the core 2 513. For example, the multi-core processor 200 copies information stored in registers in the core 4 515 to registers in the core 2 513. Also, the multi-core processor 200 copies cache information included in the core 4 515 to the core 2 513. For example, the multi-core processor 200 flushes cache information of the core 4 515 and performs a write-back.

Finally, the multi-core processor 200 releases the allocation of the core 4 515 with respect to the first process and allocates the core 2 513 to the first process.

Also, the multi-core processor 200 copies information included in the core 5 516 to the core 3 514. Also, the multi-core processor 200 releases the allocation of the core 5 516 to the first process, and allocates the core 3 514 to the first process.

The multi-core processor 200 revises the translation table 712. Referring to revised translation table 722, the multi-core processor 200 revises the physical ID 4 of the core 4 515 included in the translation table 712 to a physical ID 2 of the core 2 513. Also, the multi-core processor 200 revises the physical ID 5 of the core 5 516 included in the translation table 712 to a physical ID 3 of the core 3 514 in the revised translation table 722 for the first process.

Figure 8:
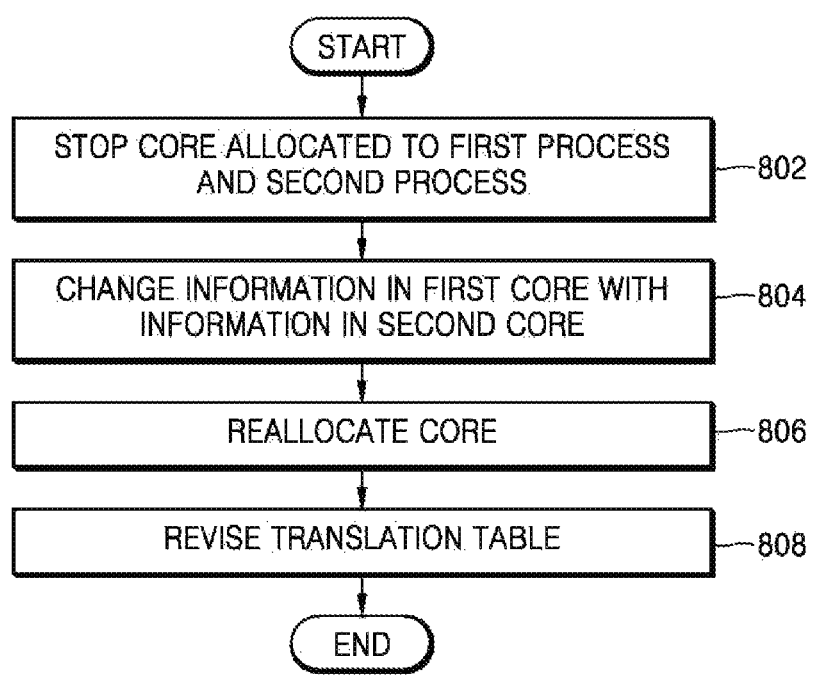
FIG. 8 is a flowchart of a method of exchanging cores between processes, according to an embodiment.

FIG. 8 is a flowchart of a method of exchanging cores between processes, according to an embodiment.

The multi-core processor 200 changes a core allocated to the first process with a core allocated to the second process. For example, the multi-core processor 200 changes the first core allocated to the first process with the second core allocated to the second process.

In an operation 802, the multi-core processor 200 stops the cores allocated to the first and second processes. According to one or more embodiments, the multi-core processor 200 stops clocks of all of the cores allocated to the first process and the second process.

In an operation 804, the multi-core processor 200 changes information included in the first core with information included in the second core. The multi-core processor 200 copies information included in the first core to the second core. The multi-core processor 200 copies information included in the second core to the first core. The multi-core processor 200 copies volatile information included in the first core to the second core. For example, the multi-core processor 200 copies information stored in registers in the first core to registers in the second core. According to one or more embodiments, a third storage location is employed to temporarily store information from one of the first and second processes during the transfer period to ensure that values are not over-written in unrecoverable manner. Also, the multi-core processor 200 copies cache information included in the first core to the second core. For example, the multi-core processor 200 flushes the cache information of the first core and performs a write-back. Also, the multi-core processor 200 copies volatile information included in the second core to the first core. Also, the multi-core processor 200 copies cache information included in the second core to the first core.

In an operation 806, the multi-core processor 200 reallocates cores. The multi-core processor 200 releases the allocation of the first core with respect to the first process. Also, the multi-core processor 200 releases the allocation of the second core with respect to the second process. The multi-core processor 200 allocates the second core to the first process and the first core to the second process.

In an operation 808, the multi-core processor 200 revises a translation table with respect to the first process and a translation table with respect to the second process. The multi-core processor 200 revises a physical ID of the first core included in the translation table with respect to the first process to a physical ID of the second core. Also, the multi-core processor 200 revises a physical ID of the second core included in the translation table with respect to the second process to a physical ID of the first core.

Figure 9:
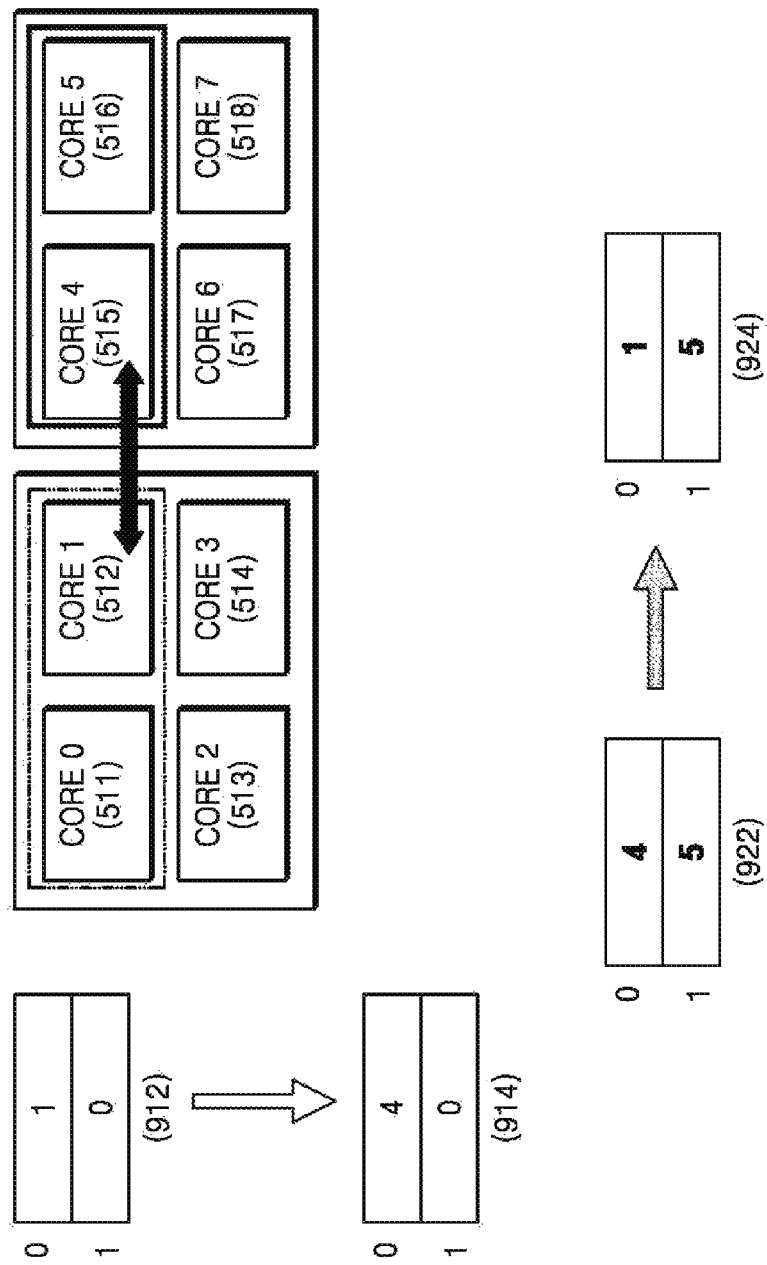
FIG. 9 shows a drawing explaining a method of changing cores between processes, according to an embodiment.

FIG. 9 is a drawing explaining a method of exchanging cores between processes, according to an embodiment.

The multi-core processor 200 allocates the core 4 515 and the core 5 516 to the first process. Also, the multi-core processor 200 generates a translation table 922 with respect to the first process. In the translation table 922, a logical ID 0 corresponds to the core 4 515, and the logical ID 1 corresponds to the core 5 516.

The multi-core processor 200 allocates a core 0 511 and a core 1 512 to the second process. Also, the multi-core processor 200 generates a translation table 912 with respect to the second process. In the translation table 912, the logical ID 0 corresponds to the core 1 512, and the logical ID 1 corresponds to the core 0 511.

The multi-core processor 200 changes at least one core allocated to the first process with at least one core allocated to the second process. For example, the multi-core processor 200 changes the core 4 515 allocated to the first process with the core 1 512 allocated to the second process.

The multi-core processor 200 stops the core 4 515 and the core 5 516 allocated to the first process. At this point, the multi-core processor 200 stops clocks of the core 4 515 and the core 5 516. Also, the multi-core processor 200 stops the core 0 511 and the core 1 512 allocated to the second process. At this point, the multi-core processor 200 stops the clocks of the core 0 511 and the core 1 512.

The multi-core processor 200 copies information included in the core 4 515 to the core 1 512. The multi-core processor 200 copies volatile information included in the core 4 515 to the core 1 512. For example, the multi-core processor 200 copies information stored in registers in the core 4 515 to registers in the core 1 512. The multi-core processor 200 copies cache information included in the core 4 515 to the core 1 512. For example, the multi-core processor 200 flushes the cache information of the core 4 515 and performs a write-back. The copying of registers from one core to another does not necessarily imply a direct copying; rather, the contents of the registers may be moved to an intermediate location to preserve the values in the copying and avoid the overwriting of one set of the registers.

Also, the multi-core processor 200 copies information included in the core 1 512 to the core 4 515. The multi-core processor 200 copies volatile information included in the core 1 512 to the core 4 515. Also, the multi-core processor 200 copies cache information included in the core 1 512 to the core 4 515.

The multi-core processor 200 releases the allocation of the core 4 515 to the first process. The multi-core processor 200 releases the allocation of the core 1 512 with respect to the second process. The multi-core processor 200 allocates the core 4 515 to the second process. Also, the multi-core processor 200 allocates the core 1 512 to the first process.

The multi-core processor 200 revises the translation table 922 with respect to the first process to arrive at the revised translation table 924 for the first process. Referring to the revised translation table 924, the multi-core processor 200 revises a physical ID 4 of the core 4 515 included in the translation table 922 to a physical ID 1 of the core 1 512 (as seen in revised translation table 924).

Also, the multi-core processor 200 revises the translation table 912 with respect to the second process. Referring to the revised translation table 914, the multi-core processor 200 revises a physical ID 1 of the core 1 512 included in the translation table 912 to a physical ID 4 of the core 4 515 (as seen in the revised translation table 914 for the second process).

A device according to the current embodiment may include a process, a memory that stores and executes program data, a permanent storage, such as disc drive, and a user interface, such as a communication port for communicating with an external device, a touch panel, keys, and buttons, etc. Methods realized by a software module or an algorithm may be stored as codes readable by a computer that may perform the process or on a non-transitory computer readable recording medium as program commands. The non-transitory computer readable recording medium may include a magnetic storage medium (for example, read-only memory (ROM), random-access memory (RAM), floppy disks, or hard discs) and optical readable medium (for example, CD-ROMs, Digital versatile discs (DVD)), etc. The non-transitory computer readable recording medium can also be distributed over network coupled computer systems so that the computer readable code is stored and executed in a distributed fashion.

Portions of the disclosure may be expressed as functional block configurations and various processing steps. According to one or more embodiments, the functional blocks may be realized by a configuration of a various hardware and/or software that perform specific functions. For example, an embodiment employs direct circuit configurations such as memory, processing, logic, and look-up table that perform various functions by at least one microprocessor or other control devices. Embodiments may also be realized by programming or scripting languages, such as C, C++, Java, and assembly including various algorithms that are realized in combination of data structures, processors, routines, or other programming configurations. The functional aspects may be realized in one or more algorithms that are performed in at least one processor. Also, certain embodiments employ a technique for electronic environment set-up, signal processing, and/or data processing, as would be known to one of skill in the art after gaining a thorough understanding of the detailed description. Terms such as mechanism, element, means, and configuration may be used in a broad sense, and are not limited to mechanical and physical configurations. The terms may include meanings of a series of routines of software executing or running in connection with a processor, memory, and other hardware.

Specific executions described in the current embodiment are examples, and thus, are not limited to such technical scope in any methods. For the clarity of the specification, the descriptions of conventional electronic configurations, control systems, software, and other functional aspects of the systems may be omitted for clarity and conciseness. Also, lines of connections or connection members between constituent elements depicted in the drawings are examples of functional connections and/or physical or circuitry connections, and thus, the lines may be expressed as replaceable or additional functional connections, physical connections, or circuitry connections.

In the current embodiments (particularly, in the claims), the use of the term "the" and terms similar to "the" may be applied to both singular and plural. Also, when a range is described, the range includes an individual value within the range (as long as there is no counter description) and is the same as the individual value that constitutes the range in the specification. Finally, if there is no clear description or counter description with respect to the operations that constitute a method, the operations may be executed in an appropriate sequence. The execution sequence is not necessarily limited to the description order of the operations.

The controller 220, core manager 210, schedulers 532, 542, and resource manager 520 in FIGS. 2 and 5, respectively, that perform the operations described in this application are implemented by hardware components configured to perform the operations described in this application. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors, cores, core portions, or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1, 3, and 5-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, a single core, two or more cores, a plurality of cores and a controller, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that

What is claimed is:

1. A method of controlling a multi-core processor, the method comprising:
   allocating at least one core of the multi-core processor to at least one process for execution;
   generating at least one translation table with respect to the at least one process to translate a logical ID of the at least one core allocated to the at least one process to a physical ID of the at least one core, storing the at least one translation table in a memory, and storing an address of the memory where the at least one translation table is stored in a register of the at least one core;
   in response to changing operational conditions of the multi-core processor, changing the at least one core allocated to the at least one process with at least two other cores different than the at least one core and which are not allocated to the at least one process by copying at least the address stored in the register of the at least one core to registers of the at least two other cores, and revising the at least one translation table to release allocation of the at least one core with respect to the at least one process and allocate the at least two other cores to the at least one process,
      wherein the revising of the at least one translation table comprises revising a physical ID of the at least one core in the at least one translation table with respect to the at least one process to physical IDs of the at least two other cores; and
   controlling the at least one process based on the at least one translation table revised with respect to the at least one process such that a source core of the at least two other cores allocated to the at least one process communicates with a destination core of the at least two other cores via an inter-core interrupt (ICI) bearing the logical ID of the destination core, and the multi-core processor intercepts the ICI bearing the logical ID, transforms the logical ID into the physical ID of the destination core based on the translation table, and forwards the ICI to the physical ID of the destination core.

2. The method of claim 1, wherein
   the at least one process comprises a first process,
   the at least one core allocated to the at least one process comprises a first core allocated to the first process,
   the at least two other cores that are not allocated to the at least one process comprise a second core, and a third core that are not allocated to the first process,
   the changing of the at least one core with the at least two other cores comprises changing the first core allocated to the first process with the second core and the third core that are not allocated to the first process by copying information stored in a register of the first core to registers of the second core and the third core, and releasing the allocation of the first core with respect to the first process and allocating the second core and the third core to the first process by revising the at least one translation table,
      wherein the revising of the at least one translation table comprises revising a physical ID of the first core in the at least one translation table with respect to the first process to physical IDs of the second core and the third core; and
   the controlling of the at least one process comprises controlling the first process by communicating with the second core and the third core allocated to the first process based on the at least one translation table revised with respect to the first process.

3. The method of claim 1, wherein
   the at east one process comprises a first process,
   the at east one core allocated to the at least one process comprises a first core and a second core allocated to the first process,
   the at least two other cores that are not allocated to the at least one process comprise a third core and a fourth core that are not allocated to the first process, and
   the changing of the at least one core with the at least two other cores comprises changing the first core and the second core allocated to the first process with the third core and the fourth core that are not allocated to the first process by copying information stored in registers of the first core and the second core with respect to the first process to registers of the third core and the fourth core, respectively and releasing the allocation of the first core and the second core with respect to the first process and allocating the third core and the fourth core to the first process by revising the at least one translation table.

4. The method of claim 3, wherein the revising of the at least one translation table comprises
   revising a physical ID of the first core and the second core in the at least one translation table with respect to the first process to a physical ID of the third core and the fourth core, respectively; and
   the controlling of the at least one process comprises controlling the first process by communicating with the third core and the fourth core allocated to the first process based on the at least one translation table revised with respect to the first process.

5. The method of claim 3, wherein
   the at least one process further comprises a second process,
   the at least two other cores comprising the third core and the fourth core are allocated to the second process, and
   the changing of the at least one core with the at least two other cores further comprises changing the third core and the fourth core allocated to the second process with the first core and the second core that are not allocated to the second process by copying information stored in the registers of the third core and the fourth core with respect to the second process to the registers of the first core and the second core, respectively, and releasing the allocation of the third core and the fourth core with respect to the second process and allocating the first core and the second core to the second process by revising the at least one translation table,
      wherein the copying of the information stored in the registers of the first core and the second core with respect to the first process and the copying of the information stored in the registers of the third core and the fourth core with respect to the second process comprises temporarily storing the information with respect to the first process and the information with respect to the second process in the memory during a transfer period.

6. The method of claim 5, wherein the revising of the at least one translation table comprises
   revising a physical ID of the first core and the second core in the at least one translation table with respect to the first process to a physical ID of the third core and the fourth core, respectively, and
revising the physical ID of the third core and the fourth core in the at least one translation table with respect to the second process to the physical ID of the first core and the second core, respectively; and
the controlling of the at least one process comprises
controlling the first process by communicating with the third core and the fourth core allocated to the first process based on the at least one translation table revised with respect to the first process, and
controlling the second process by communicating with the first core and the second core allocated to the second process based on the at least one translation table revised with respect to the second process.

7. The method of claim 5, wherein
the generating of the at least one translation table comprises: generating a first translation table with respect to the first process; storing the first translation table in the memory; and storing an address of the memory where the first translation table is stored in the registers of the first core and the second core allocated to the first process, respectively.

8. The method of claim 7, wherein the generating of the at least one translation table further comprises:
generating a second translation table with respect to the second process;
storing the second translation table in the memory; and
storing an address of the memory where the second translation table is stored in the registers of the third core and the fourth core allocated to the second process, respectively.

9. A multi-core processor comprising a plurality of cores, the multi-core processor comprising:
a core manager configured to
allocate at least one core from among the plurality of cores to at least one process for execution,
generate at least one translation table with respect to the at least one process to translate a logical ID of the at least one core allocated to the at least one process to a physical ID of the at least one core, store the at least one translation table in a memory, and store an address of the memory where the at least one translation table is stored in a register of the at least one core allocated to the at least one process,
in response to changing operational conditions of the multi-core processor, change the at least one core allocated to the at least one process with at least two other cores different than the at least one core and which are not allocated to the at least one process by copying at least the address stored in the register of the at least one core to registers of the at least two other cores, and revising the at least one translation table to release allocation of the at least one core with respect to the at least one process and allocate the at least two other cores to the at least one process,
wherein the revising of the at least one translation table comprises revising a physical ID of the at least one core in the at least one translation table with respect to the at least one process to physical IDs of the at least two other cores; and
a controller configured to control the at least one process based on the at least one translation table revised with respect to the at least one process such that a source core one of the at least two other cores allocated to the at least one process communicates with a destination core of the at least two other cores via an inter-core interrupt (ICI) bearing the logical ID of the destination core, and the multi-core processor intercepts the ICI bearing the logical ID, transforms the logical ID into the physical ID of the destination core based on the translation table, and forwards the ICI to the physical ID of the destination core.

10. The multi-core processor of claim 9, wherein
the at least one process comprises a first process,
the at least one core allocated to the at least one process comprises a first core allocated to the first process,
the at least two other cores that are not allocated to the at least one process comprise a second core, and a third core that are not allocated to the first process,
the core manager is further configured to change the at least one core with the at east two other cores by changing the first core allocated to the first process with the second core and the third core that are not allocated to the first process by copying information stored in a register of the first core to registers of the second core and the third core, and releasing the allocation of the first core with respect to the first process and allocating the second core and the third core to the at least one process by revising the at least one translation table,
wherein the revising of the at least one translation table comprises revising a physical ID of the first core in the at least one translation table with respect to the first process to physical IDs of the second core and the third core, and
the controller is further configured to control the at least one process by controlling the first process by communicating with the second core and the third core allocated to the first process using the at least one translation table revised with respect to the first process.

11. The multi-core processor of claim 9, wherein
the at least one process comprises a first process,
the at least one core allocated to the at least one process comprises a first core and a second core allocated to the first process,
the at least two other cores that are not allocated to the at least one process comprise a third core and a fourth core that are not allocated to the first process, and
the core manager is further configured to change the at least one core with the at least two other cores by changing the first core and the second core allocated to the first process with the third core and the fourth core that are not allocated to the first process by copying information stored in registers of the first core and the second core with respect to the first process to registers of the third core and the fourth core, respectively, and releasing the allocation of the first core and the second core with respect to the first process and allocating the third core and the fourth core to the first process by revising the at least one translation table.

12. The multi-core processor of claim 11, wherein
the core manager is further configured to revise the at least one translation table by revising a physical ID of the first core and the second core in the at least one translation table with respect to the first process to a physical ID of the third core and the fourth core, respectively, and
the controller is further configured to control the at least one process by controlling the first process by communicating with the third core and the fourth core allocated to the first process using the at least one translation table revised with respect to the first process.

13. The multi-core processor of claim 11, wherein
the at least one process further comprises a second process,
the at least two other cores comprising the third core and the fourth core are allocated to the second process, and
the core manager is further configured to change the at least one core with the at least two other cores by changing the third core and the fourth core allocated to the second process with the first core and the second core that are not allocated to the second process by copying information stored in the registers of the third core and the fourth core with respect to the second process to the registers of the first core and the second core, respectively, and releasing the allocation of the third core and the fourth core with respect to the second process and allocating the first core and the second core to the second process by revising the at least one translation table,
 wherein the copying of the information stored in the registers of the first core and the second core with respect to the first process and the copying of the information stored in the registers of the third core and the fourth core with respect to the second process comprises temporarily storing the information with respect to the first process and the information with respect to the second process in the memory during a transfer period.

14. The multi-core processor of claim 13, wherein
the core manager is further configured to revise the at least one translation table by
 revising a physical ID of the first core and the second core in the at least one translation table with respect to the first process to a physical ID of the third core and the fourth core, respectively, and
 revising the physical ID of the third core and the fourth core in the at least one translation table with respect to the second process to the physical ID of the first core and the second core, respectively, and
the controller is further configured to control the at least one process by
 controlling the first process by communicating with the third core and the fourth core allocated to the first process using the at least one translation table revised with respect to the first process, and
 controlling the second process by communicating with the first core and the second core allocated to the second process using the at least one translation table revised with respect to the second process.

15. The multi-core processor of claim 13, wherein the core manager is further configured to generate the at least one translation table by,
 generating a first translation table with respect to the first process,
 storing the first translation table in the memory, and
 storing an address of the memory where the first translation table is stored in the registers of the first core and the second core allocated to the first process, respectively.

16. The multi-core processor of claim 15, wherein the core manager is further configured to generate the at least one translation table by,
 generating a second translation table with respect to the second process;
 storing the second translation table in the memory; and
 storing an address of the memory where the second translation table is stored in the registers of the third core and the fourth core allocated to the second process, respectively.

17. A non-transitory computer-readable storage medium storing instructions that, when executed by a processor, cause the processor to perform the method of claim 1.

* * * * *

UNITED STATES PATENT AND TRADEMARK OFFICE
CERTIFICATE OF CORRECTION

| | | |
|---|---|---|
| PATENT NO. | : 10,713,095 B2 | Page 1 of 1 |
| APPLICATION NO. | : 15/469828 | |
| DATED | : July 14, 2020 | |
| INVENTOR(S) | : Donghoon Yoo et al. | |

It is certified that error appears in the above-identified patent and that said Letters Patent is hereby corrected as shown below:

On the Title Page

Item (73) Assignee: "Samsung Electronics Co., Ltd., Gyeonggi-do (KR)" Should read --Samsung Electronics Co., Ltd., Gyeonggi-do (KR) and Seoul National University R&DB Foundation, Seoul (KR)--

Signed and Sealed this
Eighth Day of August, 2023

Katherine Kelly Vidal
*Director of the United States Patent and Trademark Office*